(12) United States Patent
Wibben et al.

(10) Patent No.: US 10,954,680 B2
(45) Date of Patent: *Mar. 23, 2021

(54) INFLATABLE GOLF STUDIO

(71) Applicant: Golf Pro Delivered, LLC, Port Washington, NY (US)

(72) Inventors: Jeff Wibben, Kings Park, NY (US); Nick Miller, Williston Park, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/823,880

(22) Filed: Mar. 19, 2020

(65) Prior Publication Data

US 2020/0217097 A1 Jul. 9, 2020

Related U.S. Application Data

(63) Continuation of application No. 16/423,694, filed on May 28, 2019, now Pat. No. 10,597,883, which is a (Continued)

(51) Int. Cl.
*E04H 3/14* (2006.01)
*E04B 1/343* (2006.01)
(Continued)

(52) U.S. Cl.
CPC .............. *E04H 3/14* (2013.01); *A63B 69/36* (2013.01); *A63B 69/3623* (2013.01); *A63B 71/0619* (2013.01); *E04B 1/34* (2013.01); *E04B 1/34336* (2013.01); *E04B 1/941* (2013.01); *E04D 13/033* (2013.01); *E04D 13/0335* (2013.01); *E04H 15/20* (2013.01); *F24F 5/00* (2013.01); *A63B 2024/0034* (2013.01); *A63B 2210/50* (2013.01); *A63B 2225/62* (2013.01); *E04B 1/3205* (2013.01); *E04H 2015/202* (2013.01); *E06B 3/54* (2013.01); *E06B 3/80* (2013.01); *F24F 2221/08* (2013.01); *F24F 2221/12* (2013.01); *G03B 21/58* (2013.01); *G03B 21/585* (2013.01); *H04N 5/645* (2013.01); *H04N 5/655* (2013.01)

(58) Field of Classification Search
CPC ...... E04B 1/34336; A63B 69/36; G03B 21/58; E04H 2015/202; E04H 15/20; H04N 5/655; F24F 2221/12
See application file for complete search history.

(56) References Cited

U.S. PATENT DOCUMENTS 2,591,829 A 4/1952 Katzenmeyer
2,754,836 A 7/1956 Augustus
(Continued)

*Primary Examiner* — Babajide A Demuren
(74) *Attorney, Agent, or Firm* — Carter, DeLuca & Farrell LLP

(57) ABSTRACT

A portable inflatable golf studio including an arcuate shaped roof panel, first and second side panels, a floor panel, a front panel, a back panel, a projector screen, a projector, and a tracking system. The first and second side panels are positioned parallel from one another and are attached to the arcuate shaped roof panel, wherein one of the first and second side panels defines a cavity configured to receive a television monitor. The floor panel configured to connect the first and second side panels to one another. The front panel removable attached to the arcuate shaped roof panel and the first and second side panels. The back panel positioned parallel to the front panel and attached to the arcuate shaped roof panel and the first and second side panels. Each panel includes one or more of inflatable sections.

18 Claims, 7 Drawing Sheets

Related U.S. Application Data continuation of application No. 15/698,581, filed on Sep. 7, 2017, now Pat. No. 10,301,834.

(60) Provisional application No. 62/469,661, filed on Mar. 10, 2017, provisional application No. 62/384,430, filed on Sep. 7, 2016.

(51) Int. Cl.

| | | |
|---|---|---|
| *E04B 1/94* | (2006.01) | |
| *E04D 13/03* | (2006.01) | |
| *F24F 5/00* | (2006.01) | |
| *A63B 69/36* | (2006.01) | |
| *E04H 15/20* | (2006.01) | |
| *E04B 1/34* | (2006.01) | |
| *A63B 71/06* | (2006.01) | |
| *H04N 5/655* | (2006.01) | |
| *G03B 21/58* | (2014.01) | |
| *E04B 1/32* | (2006.01) | |
| *E06B 3/80* | (2006.01) | |
| *E06B 3/54* | (2006.01) | |
| *H04N 5/645* | (2006.01) | |
| *G03B 21/585* | (2014.01) | |
| *A63B 24/00* | (2006.01) | |

(56) References Cited

U.S. PATENT DOCUMENTS

| | | |
|---|---|---|
| 2,955,606 A | 10/1960 | Walker |
| 3,393,479 A | 7/1968 | Slotnick |
| 4,167,266 A | 9/1979 | Tabicman et al. |
| 4,295,302 A | 10/1981 | Liu |
| 4,384,435 A | 5/1983 | Polise |
| 4,550,533 A | 11/1985 | Fraioli |
| 5,987,822 A | 11/1999 | McNiff et al. |
| 6,332,455 B1 | 12/2001 | Sumida et al. |
| 6,929,016 B2 | 8/2005 | Lee |
| 8,164,830 B2 | 4/2012 | Astill |
| 9,186,577 B2 | 11/2015 | Weitzner et al. |
| 9,499,970 B2 | 11/2016 | Milo et al. |
| 2006/0260226 A1 | 11/2006 | Gower |
| 2009/0061971 A1 | 3/2009 | Weitzner |
| 2010/0281783 A1 | 11/2010 | Harrington |
| 2011/0250939 A1 | 10/2011 | Hobler |
| 2012/0117891 A1 | 5/2012 | Gower |
| 2012/0291362 A1 | 11/2012 | Milo |
| 2013/0231198 A1 | 9/2013 | Nicora |
| 2015/0042822 A1 | 2/2015 | Le |
| 2015/0101258 A1 | 4/2015 | Milo |
| 2017/0209764 A1 | 7/2017 | Choi |

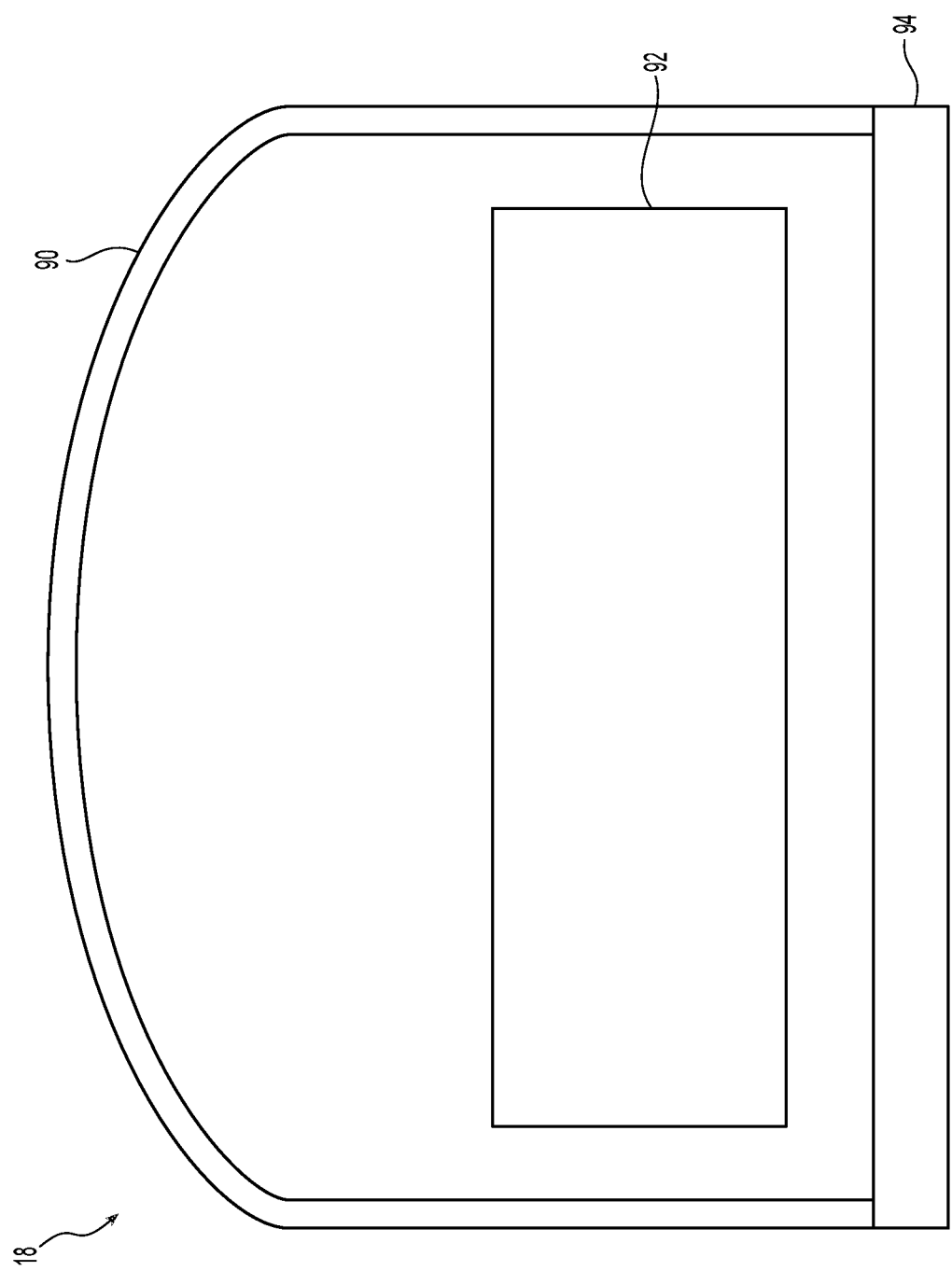

INFLATABLE GOLF STUDIO

CROSS REFERENCE TO RELATED APPLICATIONS

The present application is a Continuation of U.S. patent application Ser. No. 16/423,694, filed on May 28, 2019, which is a Continuation of U.S. patent application Ser. No. 15/698,581, filed on Sep. 7, 2017, now U.S. Pat. No. 10,301,834, which claims the benefit of and priority to U.S. Provisional Patent Application Ser. No. 62/384,430, filed on Sep. 7, 2016 and to U.S. Provisional Patent Application Ser. No. 62/469,661, filed on Mar. 10, 2017, the entire contents of each of which are incorporated herein by reference.

BACKGROUND

Technical Field

The present disclose relates to a portable inflatable sports unit, more particularly, to a portable inflatable golf studio, configured to provide shelter to a user while providing instructional tools to improve the user's golf swing, and methods of use of the same.

Background of Related Art

Current inflatable sporting units have limited use. Generally, inflatable sporting units require mild weather conditions. Also, currently available inflatable sporting units lack mobility and do not offer a structure that can include helpful training aids. Thus, a need exists for an inflatable sporting unit that can handle inclement weather, is relatively mobile, and can support various training aids.

SUMMARY

In accordance with the present disclosure, an inflatable golf studio includes an arcuate shaped roof panel, first and second side panels, a floor panel, a front panel and a back panel. The arcuate shaped roof panel including plurality of skylight cutouts defined therethrough. The first and second side panels including a plurality of windows defined therethrough, the first and second side panels are positioned parallel from one another and are attached to the arcuate shaped roof panel. Wherein one of the first and second side panels define a cavity configured to receive a television monitor. The floor panel configured to connect the first and second side panels to one another. The front panel removable attached to the arcuate shaped roof panel and the first and second side panels. The back panel is positioned parallel to the front panel and attached to the arcuate shaped roof panel and the first and second side panels. Each panel includes a plurality of inflatable section. The golf studio also includes a projector screen, a projector and a tracking system. The projector screen coupled to the back panel. The projector configured to project a simulated image upon the projector screen.

BRIEF DESCRIPTION OF THE DRAWINGS

Various aspects and features of the present disclosure are described herein with reference to the drawings wherein:

FIG. 6 is a frontal view of a front panel of the inflatable golf studio of FIG. 1.

DETAILED DESCRIPTION

Figure 1:
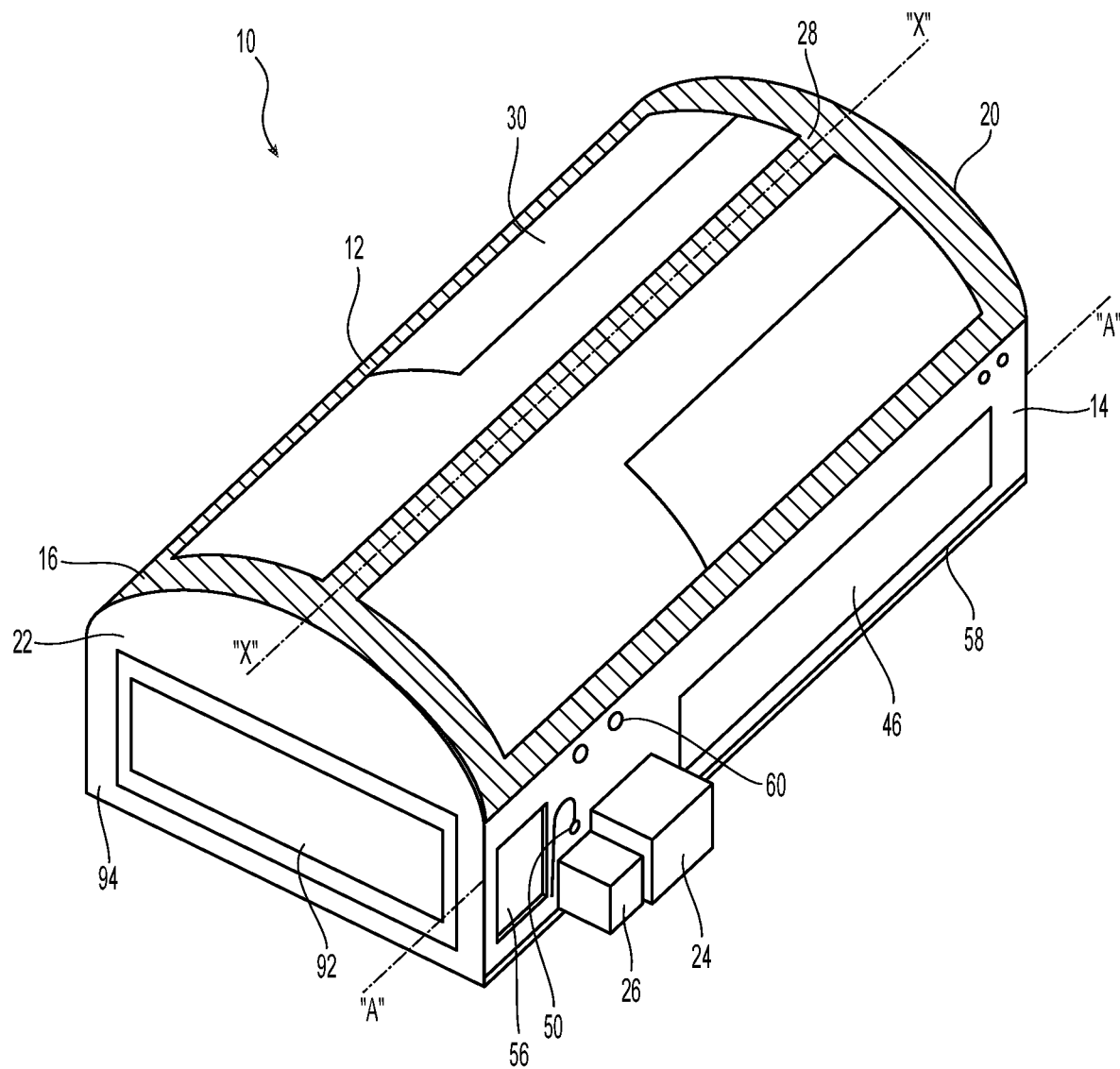
FIG. 1 is a perspective view of an inflatable golf studio provided in accordance with the present disclosure.

Embodiments of the present disclosure are now disclosed in detail with reference to the drawings in which like reference numerals designate corresponding elements in each of the several views. Throughout this description, directional terms such as front, rear, upper, lower, top, bottom, and the like are used simply for convenience of description and are not intended to limit the disclosure attached hereto.

In general, the present disclosure relates to a portable inflatable golf studio configured to provide a sheltered atmosphere for a user while providing instructional tools to enhance the user's golf swing. The portable inflatable golf studio is configured to be set up and inflated at any desired location of the user. Also, the portable inflatable golf studio includes visual instructional tools that track and monitor the user's golf swing and other tools that the user can use for training.

Figure 2:
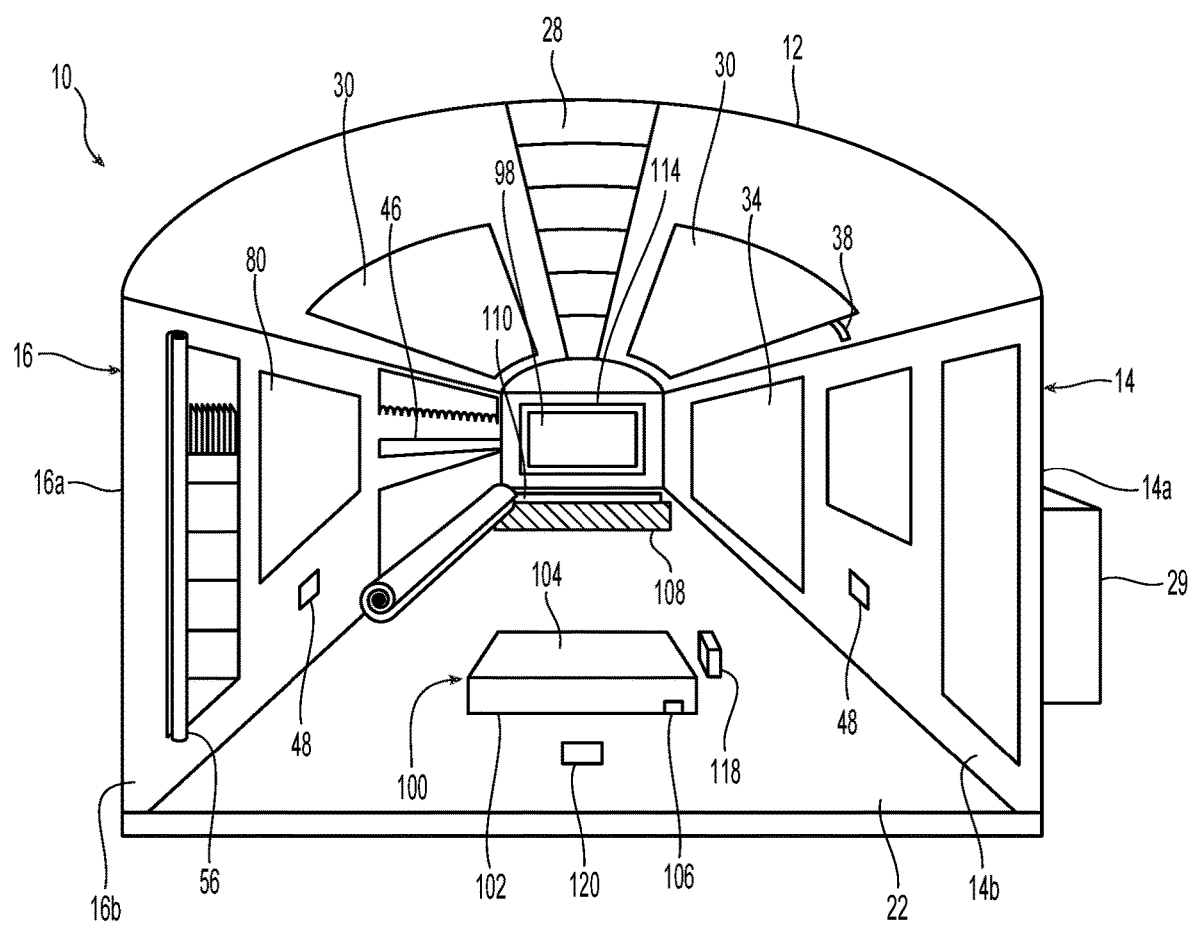
FIG. 2 is a frontal view of the inflatable golf studio of FIG. 1 with a front panel removed.

With reference to FIGS. 1 and 2, an embodiment of an inflatable golf studio 10 includes a roof panel 12, a first side panel 14, a second side panel 16, a front panel 18, a back panel 20, a floor panel 22 (FIG. 2), a generator 24, and a heating/ventilating/cooling system ("HVAC system") 26.

The roof panel 12 includes a plurality of inflatable sections 44, a plurality of skylight cutouts 30, at least one safety feature 38, attachable lighting 39, and a plurality of training aids 42. In one embodiment, the roof panel 12 includes a center support column 28 that extends along the entire length thereof and provides stability to the roof panel 12 and the entire golf studio 10. The roof panel 12 is formed with a generally arcuate shape with the center support column 28 acting as the center point of the arch. The arcuate shape of the roof panel 12 reduces the effect of cross winds and helps maintain stability of the golf studio 10. Further, the arcuate shape of the roof panel 12 prohibits any accumulation of any precipitation on the golf studio 10, thereby enhancing the general weather proof quality of the golf studio 10, which will be explained in further detail below.

The plurality of skylight cutouts 30 is defined on both sides of the center support column 28 and conform to the arcuate shape of the roof panel 12. In one embodiment, each skylight cutout 30 extends a partial length of the roof panel 12 and extends across a rear half of the roof panel 12, initiating at a center point of the roof panel 12 and ending approximately to a rear end portion of the roof panel 12. Each skylight cutout 30 may, however, extend the entire length of the roof panel 12 depending upon a particular purpose.

Each skylight cutout 30 is defined to extend through the roof panel 12 and includes three distinct layers, each included for a different purpose. The first layer 32 is connected and/or attached adjacent to an upper most layer of each skylight cutout 30 and may be made integrally formed with or completely removable from the roof panel 12. The first layer 32 may be fabricated from any clear and flexible plastic to permit natural light to enter into the golf studio 10. Accordingly, each skylight cutout 30 acts as a natural light source for the golf studio 10.

The second layer 34 is attached to an inner layer of the roof panel 12 and adjacent each skylight cutout 30. The second layer 34 is retractable, such that in a first position the second layer 34 extends to cover each skylight cutout 30 and in a second position the second layer 34 is rolled or compressed to be positioned adjacent to the proximal or distal end of each skylight cutout 30. The second layer 34 may be detachable from the roof panel 12. The second layer 34 may be fabricated from a "blackout" material that prohibits any light from passing therethrough. The second layer 34 is included so that the user may cover each skylight cutout 30 to prohibit natural light from entering into the golf studio 10 via each skylight cutout 30, which may enhance the user's ability to view a projector screen 98 positioned at a distal end of the golf studio 10 (FIG. 2). This may be dependent on the time of day.

The third layer 36 is a ballistic netting material configured to absorb all impact energy from any projecting object, such as a golf ball. The third layer 36 extends across a partial and/or entire length of the roof panel 12 and adjacent the inner surface of the roof panel 12. The third layer 36 is positioned to overlay the second layer 34 of each skylight cutout 30. The third layer 36 serves to inhibit any unwanted ricochet of a golf ball or any other projected object. Additionally, the third layer 36 also provides a layer of protection to roof panel 12 and safeguards against possible puncturing events. The third layer 36 may also act as an additional barrier for each skylight cutout 30, thereby lessening the chances that a golf ball or any other projected object may exit a skylight cutout 30.

The roof panel 12 includes one or more safety feature 38. In one embodiment, an easily removable panel may be defined anywhere within the roof panel 12. This allows a user to quickly eject the safety feature 38 from the roof panel 12 providing an additional exit in case of emergency. The safety feature 38 is marked with appropriate signage identifying to the user where the safety feature 38 is located. In embodiments, one of the skylight cutouts 30 may double as a safety feature 38. In this instance, the skylight cutout 30 includes a mechanism that permits quick ejection of the skylight cutout 30, thereby providing an additional exit in case of an emergency.

Figure 5:
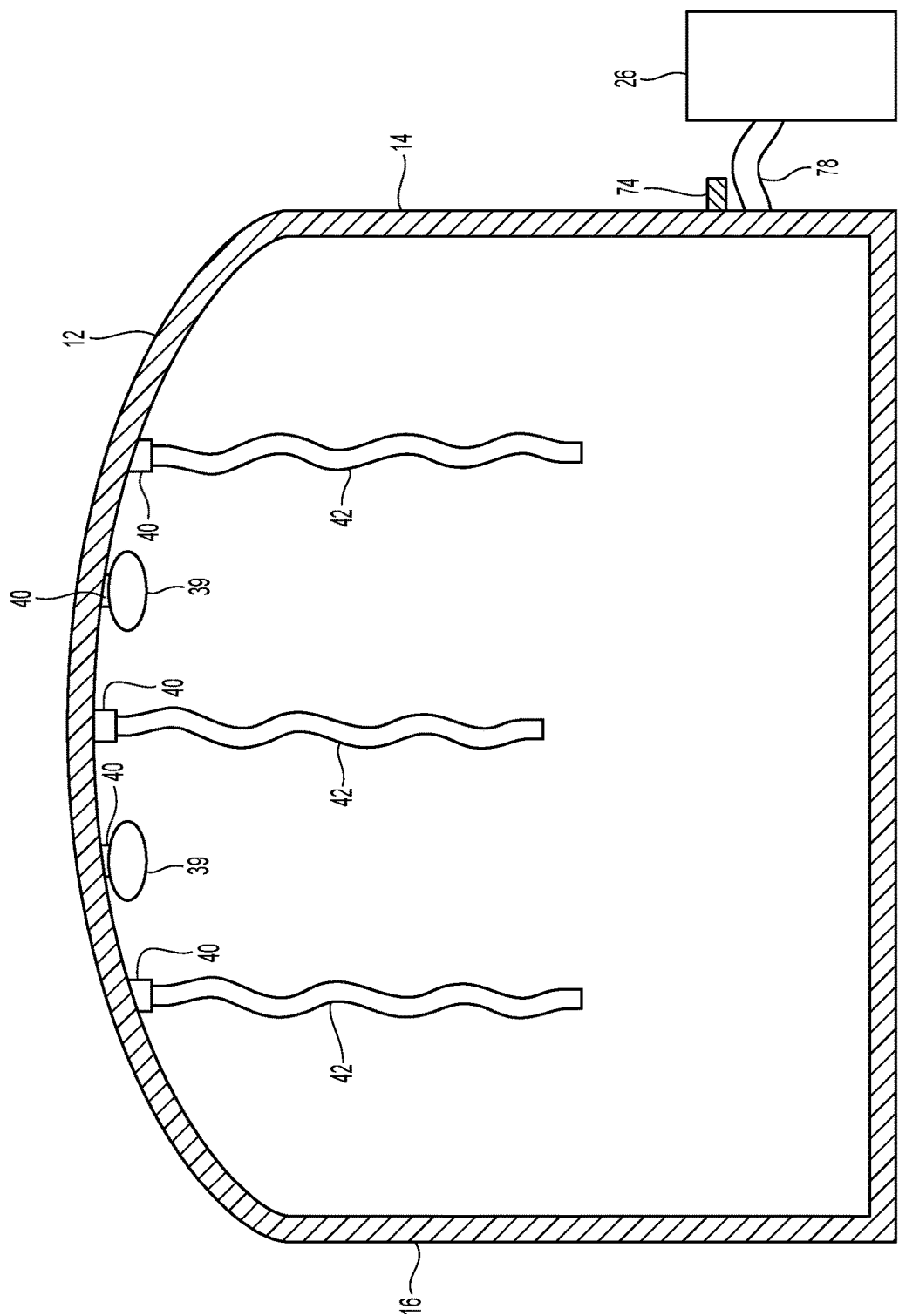
FIG. 5 is a cross-sectional, frontal view of the inflatable golf studio of FIG. 1.

Briefly moving to FIG. 5, the plurality of attachable lights 39 and the plurality of training aids 42 are illustrated. An inner surface 12a of the roof panel 12 includes one or more attachment spots 40 configured to secure one or more attachable lights 39 to the roof panel 12. The attachment spots 40 may include hook and loop fasteners, commonly sold under the trademark Velcro™, d-ring hooks, or any other appropriate method of attachment. Each attachable light 39 includes an attachment feature configured to connect the attachable light 39 to the attachment spot 40. Each attachable light 39 may be shatterproof, thereby preventing unwanted breakage of the attachable light 39 if hit by a golf ball or any other object. The third layer 36 may overlay one or more of the attachable lights 39 or the attachable lights 39 may be configured to rest on top of the third layer 36. In embodiments where the attachable lights 39 rest on top of the third layer 36, each attachable light 39 is covered by an additional netting layer to provide additional protection to each attachable light 39. The user can easily adjust the lighting of the golf studio 10 by adding or removing attachable lights 39 as needed.

The training aids 42 may include any number of different training aids 42, such as resistance bands, straps, visual indicators, alignment mechanisms, etc. Each training aid 42 is secured to the roof panel 12 via an attachment spot 40. Each training aid 42 is configured to help develop the user's golf swing. The user or instructor can select the location of each training aid 42 based of the user's need.

Figure 3:
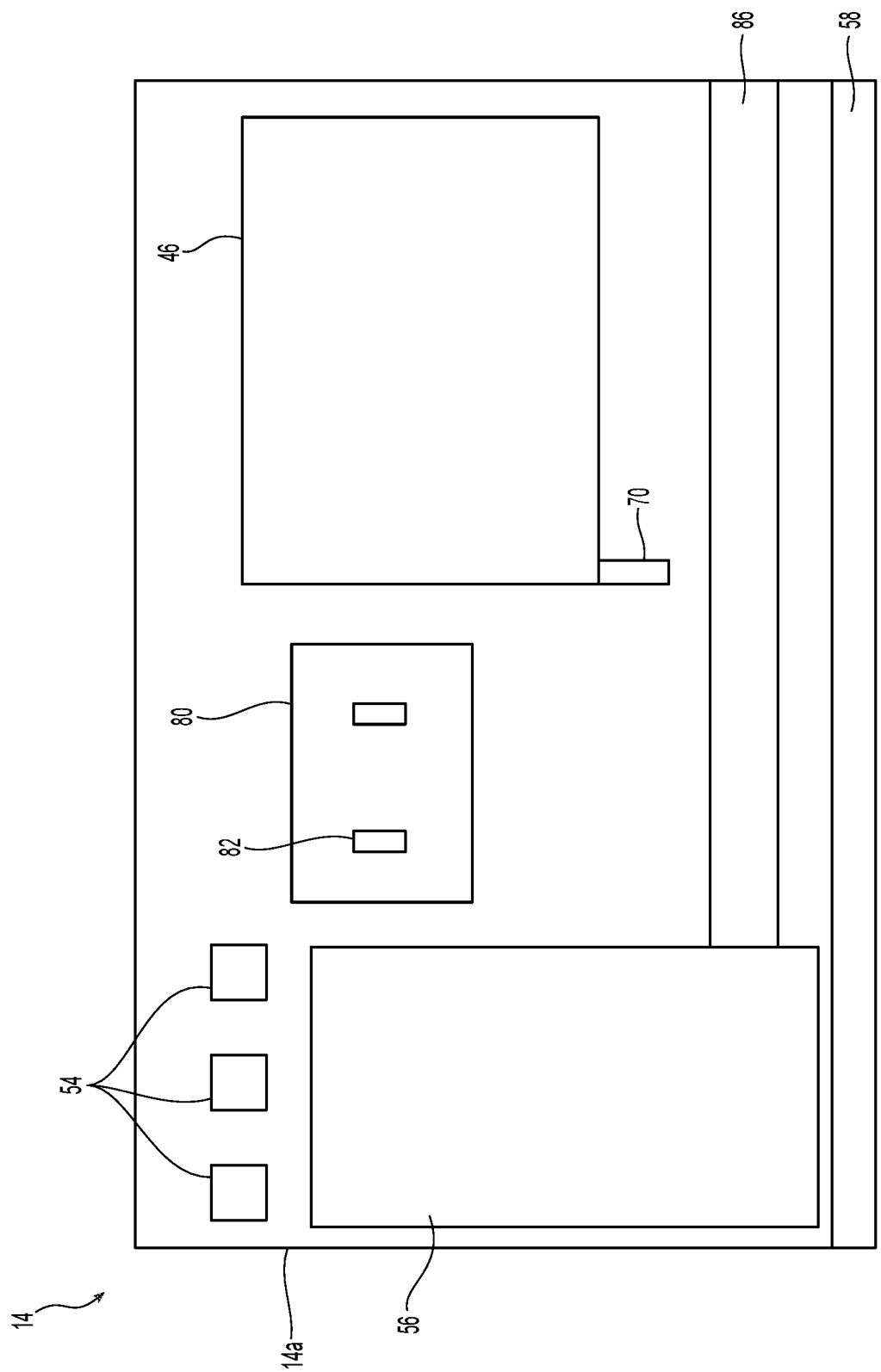
FIG. 3 is a cross-sectional view of the inflatable golf studio of FIG. 1.
Figure 3A:
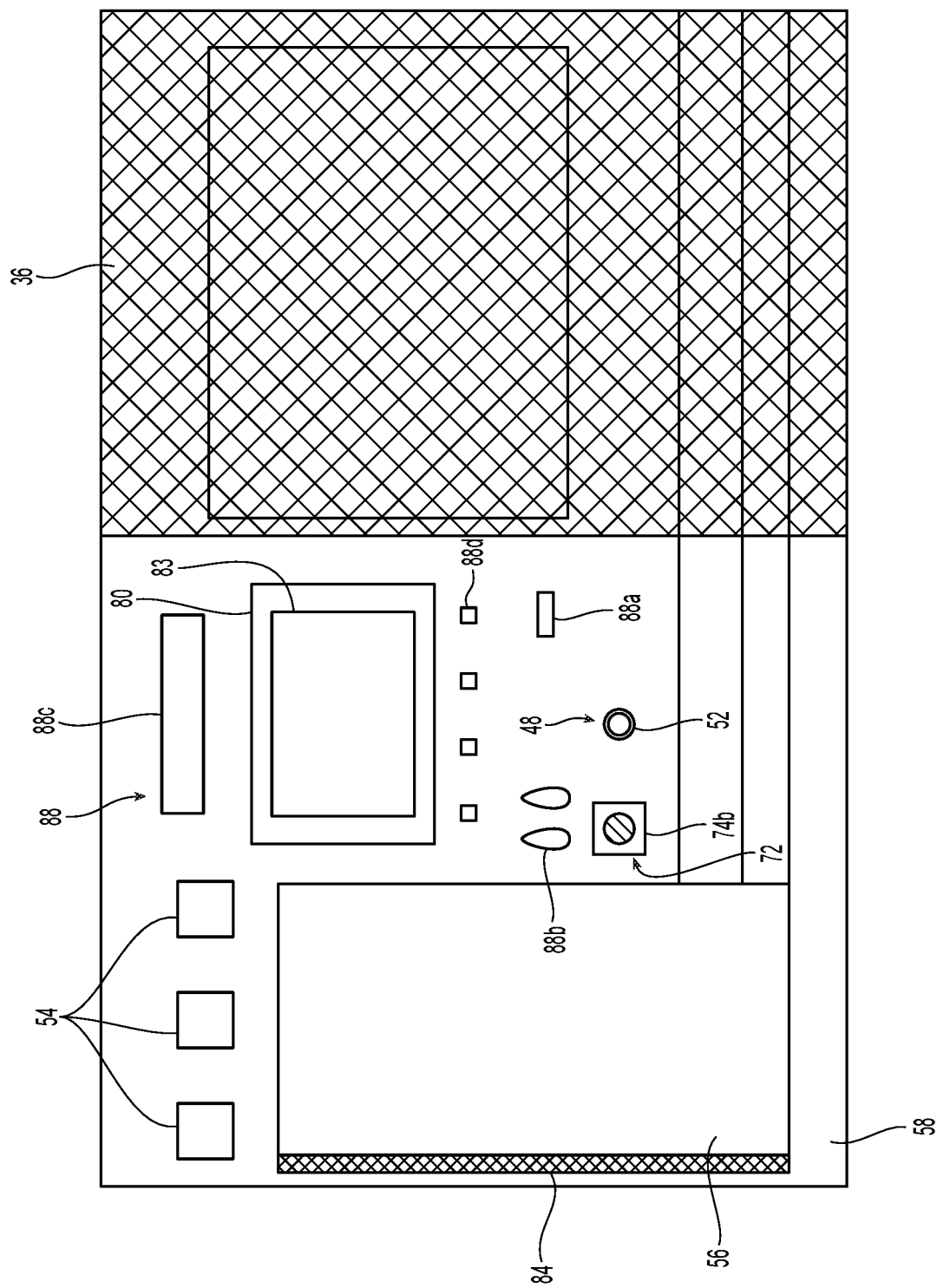
FIG. 3A is a cross-sectional view of the inflatable golf studio of FIG. 1 including a netting feature.

Returning to FIGS. 1 and 2 and with additional reference to FIGS. 3 and 3A, both the first and second side panels 14, 16 include an outer surface 14b, 16b, an inner surface 14a, 16a, one or more inflatable sections 44, one or more windows 46, one or more apertures 48, one or more removable panels 54, an entrance door 56, a rain wall 58, and one or more attachments 60. Each of the first and second side panels 14, 16 are connected and/or attached to the roof panel 12, wherein the first and second side panels 14, 16 are positioned parallel to one another and extend the entire length of the roof panel 12.

Each of the first and second side panels 14, 16 includes one or more windows 46 defined therein. The one or more windows 46 are similar to the skylight cutouts 30, and thus, only the differences therebetween will be discussed in further detail. The length of each window 46 corresponds to the length of each skylight cutout 30. One or more windows 46 may be defined within a rear portion of each of the first and second side panels 14, 16.

Each of the first and second side panels 14, 16 includes the third layer 36, which is configured to drape across each window 46 and/or the entire rear portion of both the first and second side panels 14, 16. The third layer 36 may be formed into one continuous ballistic netting material that is configured to overlay the roof panel 12 and drape across the entire rear portion of both the first and second side panels 14, 16. In embodiments, the third layer 36 includes separate and distinct sections, wherein each section is configured to either overlay the roof panel 12 and/or drape across the entire rear portion of both the first and second side panels 14, 16.

Each window 46 includes an emergency strap 70, which is configured to rip off window 46 and provide an additional exit in case of an emergency. The emergency strap 70 is clearly marked, thereby indicating to the user what to grab and/or pull in case of an emergency.

Each of the first and second side panels 14, 16 includes one or more apertures 48. Each aperture 48 is defined through one of the first and/or second side panels 14, 16 and is configured to receive an electrical cord or wire. Each aperture 48 includes a front opening 50 that is accessible from an outer surface 14b, 16b of each of the first and second side panels 14, 16 and an internal valve 52 that is accessible from an inner surface 14a, 16a of each of the first and second side panels 14, 16. In some embodiments, the internal valve 52 includes a duckbill valve or any other valve or configuration that prevents the escape of air contained inside the golf studio 10. The inclusion of internal valve 52 helps maintains a desired atmospheric pressure within the golf studio 10.

In either of the first and/or second side panels 14, 16, a HVAC aperture 72 is defined, which is configured to receive thermal tubing 78 and provide heating, ventilation, and cooling to the golf studio 10. The HVAC aperture 72 includes a front end portion (not illustrated), a rear end portion (not illustrated), and a cover flap 74. The front end of the HVAC aperture 72 defines a front opening accessible from the outer surface 14b, 16b of one of the first and second side panels 14, 16. The cover flap 74 is positioned over the front end portion and is configured to move between a first position and a second position. In the first position the cover flap 74 covers the front end portion, and in the second position, the cover flap 74 is fully removable from the first or second side panels 14, 16 or transitions into a position wherein the front end portion is full exposed. The rear end portion of the HVAC aperture 72 defines a rear opening accessible from the inner surface 14a, 16a of one of the first and second side panels 14,16. The rear opening is covered by an inner cover 76 including one or more slots configured to allow the passage of air to either heat, ventilate, and/or cool the golf studio 10. The inner cover 76 can be completely or partially removable from either the first and/or second side panels 14, 16 or can be integrally formed therewith.

The thermal tubing 78 is configured to attach to a mobile HVAC system 26, which may be placed adjacent to the golf studio 10 to provide heating, ventilation, and/or cooling to the golf studio 10. The thermal tubing 78 may be attached or coupled to an inner surface of the HVAC aperture 72 and may be configured to extend therethrough, thereby exiting from a front end portion of the HVAC aperture 72. By exiting from the front end portion of the HVAC aperture 72, the user can attach the thermal tubing 78 to the mobile HVAC system 26. When the mobile HVAC system 26 is not in use, the thermal tubing 78 may be rolled or compressed to fit within the HVAC aperture 72 for storage. The cover flap 74 will seal the HVAC aperture 72 and inhibit the thermal tubing 78 from escaping the HVAC aperture 72. The inclusion of the mobile HVAC system 26 allows the user or instructor to adjust the temperature within the golf studio as needed. Also, one or more removable insulating panels 45 may be attached to the first and second side panels 14, 16 to further insulate the golf studio 10 and help regulate the temperature within.

Each of the first and second side panels 14,16 may include a plurality of removable panels 54. Each removable panel 54 may be positioned anywhere within the first and second side panels 14, 16. In embodiments, a plurality of removable panels 54 is located within the front portion of each of the first and second side panels 14, 16. Each removable panel 54 is configured for quick and easy removal. In embodiments, each removable panel 54 is configured to be completely removed from either the first and/or second side panels 14, 16, thereby creating a passageway or aperture through the side panels. The plurality of removable panels 54 can include a range of different sized and shaped panels. The inclusion of a plurality of removable panels 54 allows the user to adjust the natural air flow in and out of the golf studio 10. An increase in natural air flow within the golf studio 10 may further enhance the simulated golf experience of the user while within the golf studio 10.

An entrance door 56 is included in each of the first and second side panels 14, 16. In embodiments, the entrance door 56 includes a window panel configured to allow natural light into the golf studio 10. In other embodiments, the entrance door 56 is completely fabricated out of a clear plastic material allowing the entire entrance door 56 to act as a window.

The entrance door 56 transitions between an open position and a closed position. In the open position, the entrance door 56 is rolled or compressed to create an entrance way into the golf studio 10. In the closed position, the entrance door 56 is secured to the first and second side panels 14, 16, thereby closing the entrance and inhibiting the user from entering and/or exiting the golf studio 10. In embodiments, the entrance door 56 is secured to the side panels 14, 16 via a zipper positioned about an outer edge 56a of the entrance door 56. In other embodiments, the entrance door 56 is secure to the side panels 14,16 via hook and loop fasteners, commonly sold under the trademark Velcro™, positioned about the outer edge 56a of the entrance door 56.

A rain wall 58 is defined about a bottom edge of both the first and second side panels 14, 16. The rain wall 58 includes at least one inflatable section, which extends parallel to a horizontal axis "A" (FIG. 1) of both the first and second side panels 14, 16. The height of the rain wall 58 may range from about 0.5 feet to about 1.5 feet. The inclusion of the rain wall 58 enhances the general water proof quality of the golf studio 10 by inhibiting any unwanted fluid from flowing/entering into the golf studio 10. This feature, in addition to the general water proofing quality of the golf studio 10, allows the golf studio 10 to be inflated and used during inclement weather.

One or more attachments 60 may be attached/coupled to the outer surface 14b, 16b of both the first and second side panels 14, 16. The attachments 60 may include multipurpose attachments that can be used for a number of reasons. In embodiments, each attachment 60 is configured to attach a rain cover (not illustrated) that may be coupled to the golf studio 10 in extreme inclement weather. Each attachment 60 may take the form of a d-ring, a carabiner clip, or any other appropriate attaching device.

As seen in FIGS. 3 and 3A, the inner surface 14a of the first side panel 14 is illustrated. The inner surface 16a of the second side panel 16 is the same or similar to the inner surface 14a of the first side panel 14, and thus, will be not be illustrated or described in detail. In addition to what is described above with respect to the outer surface 14b of the first side panel 14, the inner surface 14a defines a cavity 80, a monitor hook 82, mesh pockets 84, wire pocket 86, and one or more attachment features 88. The cavity 80 is configured to house a flat screen television 83. The outer surface 14b of the first side panel 14 is disposed adjacent to the cavity 80 and creates a back wall for the cavity 80. A monitor hook 82 is secured to the back wall of the cavity 80. The monitor hook 82 is configured to secure the flat screen television 83 to the inner surface 14a of the first side panel 14.

One or more mesh pockets 84 are secured or integrally formed with the inner surface 14a of the first side panel 14. The mesh pockets 84 are configured to receive lights (not illustrated) and are positioned upon the inner surface 14a of the first side panel 14 to provide additional lighting as needed.

The first side panel 14 also defines a wire pocket 86 that is configured to house electrical wires. The wire pocket 86 extends along the entire length of the first side panel 14 and runs parallel to the horizontal axis "A" (FIG. 1) of the first side panel 14. The wire pocket 86 is secured or integrally formed with the inner surface 14a of the first side panel 14 and includes one or more detachable edges 86a. Electrical wires within the golf studio 10 may enter the wire pocket 86 via the detachable edge 86a. The inclusion of the wire pocket 86 enhances the general water proof quality of the golf studio 10 by containing the electrical wires and inhibiting any contact with any fluid that may enter into the golf studio 10.

The attachment features 88 may include any number of different types of attachment features 88, such as cup holders 88a, straps 88b, speaker mounts 88c, and attachment spots 88d. Each attachment feature 88 is secured or integrally formed with the inner surface 14a of the first side panel 14 at any appropriate location. The cup holder 88a may be configured to support a drinking container/bottle of the user(s). The strap attachment 88b may be configured to hold/secure the user's personal items, such as the user's golf bag, travel bag, purse or any other personal item. The speaker mounts 88c may be configured to support/hold mobile speakers, and the attachment spots 88d may be configured to secure detachable signs to the inner surface 14a.

With reference to FIGS. 1 and 6, the front panel 18 of the golf studio 10 includes an inflatable support arch 90, one or more removable windows 92, and the rain wall 94. The inflatable support arch 90 mirrors the curvature of the roof panel 12 and provides stability to the golf studio 10, including the front panel 18. The removable windows 92 are similar to the windows 46 defined in each of the first and second side panels 14, 16, and, thus, only the differences therebetween are discussed in further detail. In embodiments, the removable windows 92 extend horizontally across a majority of the front panel 18. The removable windows 92 may be fully detachable from the front panel 18 or partially detachable from the front panel 18. In embodiments where the removable windows 92 are partially detachable, the windows 92 may be configured to be rolled or compressed and secured to either an outer surface 18b or inner 18a surface of the front panel 18. The removable windows 92 can be coupled to the front panel 18 via hook and loop fasteners, commonly sold under the trademark Velcro™, zippers or any other appropriate method of connection.

The front panel 18 includes the third layer 36 which is configured to drape across the entire inner surface 18a of the front panel 18. In embodiments, the third layer 36 is formed into one continuous ballistic netting material that is configured to overlay the roof panel 12, drape across the entire rear portion 14d, 16d of both the first and second side panels 14, 16, and drape across the front panel 18. In other embodiments, the third layer 36 includes separate and distinct sections, wherein each section is configured to either overlay the roof panel 12 and/or drape across the entire rear portion 14d, 16d of both the first and second side panels 14, 16 and the front panel 18.

In embodiments, the front panel 18 is configured to be completely removable from the inflatable support arch 90, thereby creating an entrance at the front of the golf studio 10 while maintaining the necessary stability for golf studio 10. The front panel 18 may be coupled to the golf studio 10 via hook and loop fasteners, commonly sold under the trademark Velcro™ zippers or any other appropriate method of connection. The front panel 18 may be fully detachable or partially detachable. In the embodiments where the front panel 18 is partially detachable, the front panel 18 may be configured to be rolled or compressed and secured to either an outer surface 90b or an inner surface 90a of the inflatable support arch 90.

The rain wall 94 of the front panel 18 is similar to the rain wall 58 included in each of the first and second side panels 14, 16, and, thus, only the differences therebetween are discussed in further detail. The rain wall 94 of the front panel 18 may be completely removable from both the front panel 18 and the inflatable support arch 90.

With continued reference to FIGS. 1 and 2, the back panel 20 of the golf studio 10 is similar to the front panel 18. The back panel 20 includes an inflatable supporting arch (not illustrated), an inner surface 20a, an outer surface 20b, a projector screen 98, and a rain wall 58. The inflatable supporting arch of the back panel 20 mirrors the curvature of both the roof panel 12 and the front panel 18 and provides additional support to the golf studio 10. The rain wall 58 of the back panel 20 is an extension of the rain wall 58 included in each of the first and second side panels 14, 16, and thus, functions the same or a similar manner, and is not described in further detail.

The projector screen 98 is attachable to the inner surface 20a of back panel 20 via hook and loop fasteners, commonly sold under the trademark Velcro™, d-ring hooks, zippers or any other appropriate method of attachment. The projector screen 98 is configured to lay flush with the inner surface 20a of back panel 20 preventing any unwanted distortion of the image projected on the projector screen 98 by unwanted backlight.

Figure 4:
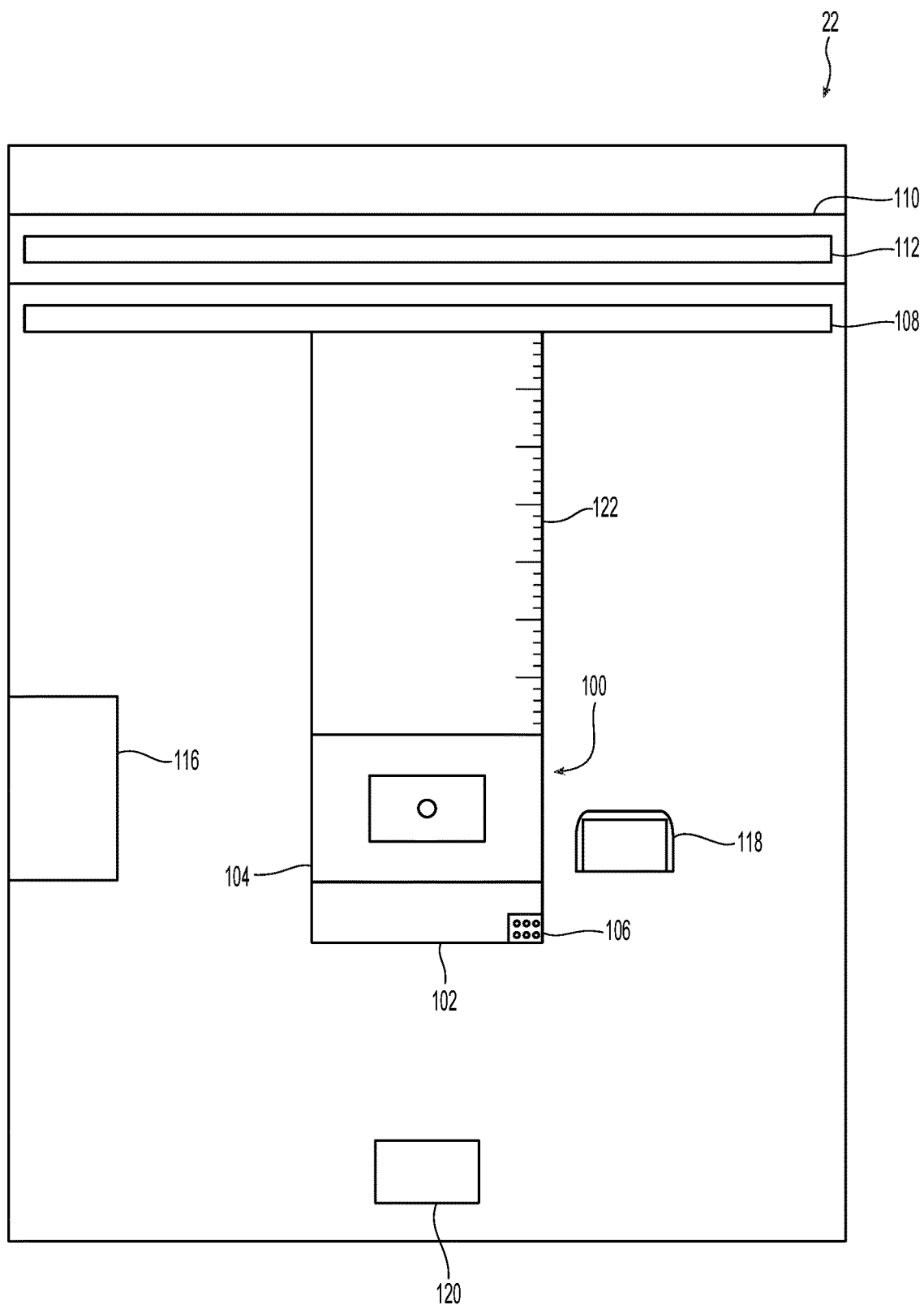
FIG. 4 is a top view of a floor panel of the inflatable golf studio of FIG. 1.

Moving to FIG. 4, the floor panel 22 includes a tee box 100, ball return slope 108, a projector guard folder 110, and an inflatable computer stand 116. The floor panel 22 may be integrally formed with the first and second side panels 14, 16 or may be completely detachable.

The tee box 100 includes a ramp 102, teeing off surface 104, and ball container 106. The teeing off surface 104 is raised above the floor panel 22 and creates a platform for the user to hit a golf ball therefrom. An inclined ramp 102 leads to the teeing off surface 104 and defines the ball container 106, that is configured to hold golf balls. The inflatable computer stand 116 may be positioned to the right or the left of the tee box 100. The computer stand 116 may be configured to support a laptop or hand held electronic device (not illustrated).

The ball return slope 108 may be formed adjacent to the back panel 20 to have an incline slope facing the front panel 18. The inclusion of the ball return slope 108 allows the golf balls to roll back towards the user which reduces the time it takes to collect the golf balls. The ball return slope 108 may be formed within the floor panel 22 or can be completely detachable therefrom.

The projector guard folder 110 may be formed adjacent to the back panel 20 within the floor panel 22 to extend vertically therefrom. The guard folder 110 defines a cavity 112 configured to receive a hard protecting material 114, such as plastic. The hard protecting material 114 extends vertically from the guard folder 110, thereby covering the projector screen 98 positioned therebehind. The hard protecting material 114 provides additional protection to the projector screen 98.

A number of different items may be attached and or positioned on the floor panel 22, such as a tracking system 118, a projector 120, and/or mats. The tracking system 118 is configured to allow the user to accurately measure and display ball flight information within the golf studio 10. The results of the tracking system 118 are displayed on the flat screen television 83. The user can use these results to better understand his or her swing and make adjustments accordingly. The projector 120 may be configured to display any desired image upon the projector screen 98. The projector 120 is positioned and approximate to the front panel 18, and may be a short throw projector, thereby allowing the user to move closer to the projector screen 98.

The golf studio 10 may include a plurality of mats, such as a putting green mat 122. This putting green mat 122 is mobile and the position may be change based on the user's need. The putting green mat 122 may include a synthetic putting surface with feet hash marks to indicate to the user the length the ball has traveled.

As mentioned above, the golf studio 10 is substantially water proof. In addition to the features mentioned above that enhance the general water proof quality of golf studio 10, the roof panel 12, the first and second side panels 14, 16, the front panel 18, the back panel 20, and the floor panel 22 may be treated with a spray-on waterproofing agent. Further, the roof panel 12, the first and second side panels 14, 16, the front panel 18, and the back panel 20 are all fabricated from a baffled material, which is configured to seal out moisture.

Additionally, a rain guard (not illustrated) can be positioned over the golf studio 10 during inflation, which adds additional protection from inclement weather. The golf studio 10 may also include water proof power strips and extensions cords. Also, a generator 24 and HVAC system 26 included with the golf studio 10 may be waterproofed and/or an additional shelter (not illustrated) may be provided.

All of the panels 12, 14, 16, 18, 20, 22 may be fabricated from a high strength material configured to withstand heavy cuts and punctures. Also, in the event of a puncture, the golf studio 10 may be designed with multi-inflatable section air flow, which mitigates the effects of any potential damage caused by a puncture and inhibits movement of the golf studio 10 in reaction to the puncture. The material may be also fire retardant. Further, each panel 12, 14, 16, 18, 20, 22 may include a plurality of deflating zippers (not illustrated) which can be unzipped to accelerate the deflation of the golf studio 10.

A method of use of the golf studio 10 includes a number of steps. First, the user contacts an instructor via the instructor's website or contact information and sets up an appointment at any desired location. The instructor surveys the location prior to the user's appointment to ensure that the location is an appropriate place for setting up the golf studio 10. If the instructor deems the location is appropriate, the instructor begins setting up the golf studio 10. If the instructor deems the location is not appropriate, the instructor will suggest an alternative location for the user's appointment that is convenient for the user. A location is deemed inappropriate if the instructor finds sharp objects, uneven surfaces, lack of space, or anything else that would hinder the lesson.

Setting up the golf studio 10 ranges from about 15 minutes to about 60 minutes, which is completed prior to the user appointment time. The golf studio 10 is transported to the location via a moving van and/or a truck with a standard truck bed. The golf studio 10 is removed from the truck via a convertible hand cart or dolly. The instructor rolls out the golf studio 10 into its main shape, and if needed, positions the generator 24 and HVAC system 26 proximate the golf studio 10. The instructor connects an inflating device to the golf studio 10, which is either powered by the generator 24 and/or a power source provided at the location. The inflating device begins to inflate the golf studio 10. While the golf studio 10 is inflating the instructor returns to the truck to retrieve all the remaining components of the golf studio 10, such as flat screen television 83 and the tracking system 118.

After the golf studio 10 is completely inflated, the instructor completes the set up by attaching the television 83 to the golf studio 10, positioning the tracking system 118, and connecting all electrical components to the generator 24 and/or the power source of the location. The instructor may adjust the lighting as necessary by either removing the second layer 34 from the skylight cutouts 30 or the windows 46 defined within the first and second side panels 14, 16 or coupling the attachable lights 39 to the roof panel 12. The instructor may adjust the natural air flow into the golf studio 10 by removing any of the windows 46 defined within the first and second side panels 14, 16, the entrance doors 56, the removable panels 54, the removable window 92 in the front panel 18 or the entire front panel 18. The lighting and natural air flow can be continuously adjusted throughout the user's appointment based on the user's needs. The instructor attaches any features of the golf studio 10 that are not physically attached to the golf studio 10 and uses markings on the floor panel 22 for guidance as to where to place any non-attached feature.

The user's appointment will then begin. During the appointment, the instructor evaluates the user's golf swing via tracking system 118 and by observing the user. The instructor will also use the flat screen television 83 to display any number of results from the tracking system 118 and/or visualizing images relating to the user's golf swing. When appropriate, the instructor uses the available training aids 42.

Upon completion of the user's appointment, the instructor removes any non-attached features that require removal prior to deflation of the golf studio 10, the flat screen television 83, and the tracking system 118. Also, the instructor reattaches any windows 46, 92, doors 56, and/or panels that were removed during the user's appointment. The instructor then deflates the golf studio 10 via the inflatable device (not illustrated) and the deflating zippers (not illustrate). The deflated golf studio 10 can then be rolled into its storage position and loaded back into the truck.

From the foregoing and with reference to the various drawings, those skilled in the art will appreciate that certain modification can also be made to the present disclosure without departing from the scope of the same. While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplification of particular embodiments. Those skilled in the art will envision other modifications with the scope and spirit of the claims appended hereto.

What is claimed is:

1. A portable golf studio, comprising:
    an inflatable structure having a plurality of inflatable panels defining an interior space;
    a projector screen selectively coupled to a panel of the plurality of panels;
    a projector configured to project an image onto the projector screen;
    a tracking system;
    a computer operatively coupled to the projector and the tracking system, the computer having a memory storing a software application, which when executed, causes the projector to project an image onto the projector screen associated with data collected by the tracking system;
    at least one window formed in at least one inflatable panel of the plurality of inflatable panels, the at least one window including a detachable panel; and
    a skylight cutout defined through a panel of the plurality of inflatable panels, the skylight cutout having a first layer formed from a translucent material and a second layer formed from a substantially opaque material, the second layer configured to be placed in a first position, where light is inhibited from passing through the skylight cutout, and a second, retracted position, where light is permitted to pass through the skylight cutout.

2. The portable golf studio according to claim 1, further including a computer stand, the computer stand configured to support the computer thereon.

3. The portable golf studio according to claim 2, wherein the computer stand is inflatable.

4. The portable golf studio according to claim 1, further including a generator in electrical communication with the computer, projector, and tracking system.

5. The portable golf studio according to claim 1, further including a television selectively coupled to a panel of the plurality of inflatable panels.

6. The portable golf studio according to claim 1, further including a heating, ventilation, and air-conditioning system in communication with the interior space of the inflatable structure.

7. The portable golf studio according to claim 1, further including training aids selectively attachable to a roof panel of the plurality of inflatable panels.

8. The portable golf studio according to claim 1, wherein the tracking system is configured to measure ball flight information.

9. The portable golf studio according to claim 8, wherein the software application causes the projector to display a calculated ball flight path based on the measured ball flight information.

10. A portable golf studio, comprising:
an inflatable structure having a plurality of inflatable panels defining an interior space;
a projector screen selectively coupled to a panel of the plurality of panels;
a projector configured to project an image onto the projector screen;
a tracking system;
at least one window formed in at least one inflatable panel of the plurality of inflatable panels, the at least one window including a detachable panel; and
a skylight cutout defined through a panel of the plurality of inflatable panels, the skylight cutout having a first layer formed from a translucent material and a second layer formed from a substantially opaque material, the second layer configured to be placed in a first position, where light is inhibited from passing through the skylight cutout, and a second, retracted position, where light is permitted to pass through the skylight cutout.

11. The portable golf studio according to claim 10, further including a computer stand, the computer stand configured to support a computer thereon.

12. The portable golf studio according to claim 11, wherein the computer stand is inflatable.

13. The portable golf studio according to claim 11, further including a generator in electrical communication with the computer, projector, and tracking system.

14. The portable golf studio according to claim 10, further including a television selectively coupled to a panel of the plurality of inflatable panels.

15. The portable golf studio according to claim 10, further including a heating, ventilation, and air-conditioning system in communication with the interior space of the inflatable structure.

16. The portable golf studio according to claim 10, further including training aids selectively attachable to a roof panel of the plurality of inflatable panels.

17. The portable golf studio according to claim 10, wherein the tracking system is configured to measure ball flight information.

18. The portable golf studio according to claim 17, wherein a software application causes the projector to display a calculated ball flight path based on the measured ball flight information.

* * * * *